US006918832B2

(12) United States Patent
Baerlocher et al.

(10) Patent No.: US 6,918,832 B2
(45) Date of Patent: *Jul. 19, 2005

(54) GAMING DEVICE WITH TRAVELING REEL SYMBOLS

(75) Inventors: Anthony J. Baerlocher, Reno, NV (US); Cari L. Blomquist, Reno, NV (US); Joseph E. Kaminkow, Reno, NV (US); Lance R. Peterson, Reno, NV (US); Bayard S. Webb, Sparks, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/409,727

(22) Filed: Apr. 8, 2003

(65) Prior Publication Data

US 2003/0190947 A1 Oct. 9, 2003

Related U.S. Application Data

(63) Continuation of application No. 09/606,928, filed on Jun. 29, 2000, now Pat. No. 6,561,900.

(51) Int. Cl.[7] .................................................. A63F 13/10

(52) U.S. Cl. ............................. 463/20; 463/31; 463/35; 463/42

(58) Field of Search .......................... 463/10–13, 16–20, 463/22, 25–27, 30–31, 35, 42; 273/138.1, 143 R; 345/473, 949; 352/87

(56) References Cited

U.S. PATENT DOCUMENTS

| | | | |
|---|---|---|---|
| 4,695,053 | A | 9/1987 | Vazquez, Jr. et al. |
| 5,449,173 | A | 9/1995 | Thomas et al. |
| 5,664,998 | A | 9/1997 | Seelig et al. |
| 5,769,716 | A | 6/1998 | Saffari et al. |

(Continued)

FOREIGN PATENT DOCUMENTS

| | | | | |
|---|---|---|---|---|
| EP | 60019 A1 * | 9/1982 | | G07F/17/34 |
| EP | 1 083 531 A1 | 3/2001 | | |
| GB | 2101380 A * | 1/1983 | | G07F/17/34 |
| WO | WO 9732285 | 9/1997 | | |

OTHER PUBLICATIONS

Goooaal! by Bally Gaming, Inc. pp. 1–2, on or before the month of Dec. in the year 2000.

Description of Symbol Feature in Australian UFO Gaming Machine by Barcrest, Ltd., on or before the month of Dec. in the year 1995.

Description of Animating Symbol Feature in Gaming Devices by IGT, prior to Jun. 29, 2000.

*Primary Examiner*—Scott E. Jones
(74) *Attorney, Agent, or Firm*—Bell, Boyd & Lloyd LLC

(57) ABSTRACT

The present invention relates to a gaming device feature which involves one or more symbols which travel from location to location on one or more reels. The travel can occur at any time during a primary game or bonus round, however it preferably occurs to accompany an outcome such as a value award. This travel feature provides players with engaging entertainment and increases player enjoyment.

89 Claims, 14 Drawing Sheets

U.S. PATENT DOCUMENTS

| | | | | | |
|---|---|---|---|---|---|
| 5,833,536 | A | | 11/1998 | Davids et al. | |
| 5,882,259 | A | | 3/1999 | Holmes, Jr. et al. | |
| 5,980,384 | A | | 11/1999 | Barrie | |
| 5,997,400 | A | | 12/1999 | Seelig et al. | |
| 5,997,401 | A | | 12/1999 | Crawford | |
| 6,033,307 | A | | 3/2000 | Vancura | |
| 6,056,642 | A | | 5/2000 | Bennett | |
| 6,059,289 | A | | 5/2000 | Vancura | |
| 6,089,976 | A | | 7/2000 | Schneider et al. | |
| 6,089,977 | A | | 7/2000 | Bennett | |
| 6,120,031 | A | | 9/2000 | Adams | |
| 6,120,376 | A | | 9/2000 | Cherry | |
| 6,135,885 | A | | 10/2000 | Lermusiaux | |
| 6,142,875 | A | | 11/2000 | Kodachi et al. | |
| 6,251,013 | B1 | * | 6/2001 | Bennett | 463/13 |
| 6,270,411 | B1 | | 8/2001 | Gura et al. | |
| 6,290,600 | B1 | | 9/2001 | Glasson | |
| 6,364,766 | B1 | * | 4/2002 | Anderson et al. | 463/16 |
| 6,439,993 | B1 | * | 8/2002 | O'Halloran | 463/16 |
| 6,551,187 | B1 | * | 4/2003 | Jaffe | 463/20 |
| 6,561,900 | B1 | * | 5/2003 | Baerlocher et al. | 463/20 |

* cited by examiner

GAMING DEVICE WITH TRAVELING REEL SYMBOLS

This application is a continuation of and claims priority to and the benefit of U.S. patent application Ser. No. 09/606,928, filed Jun. 29, 2000 now U.S. Pat. No. 6,561,900.

CROSS-REFERENCE TO RELATED APPLICATIONS

This application is related to the following commonly-owned co-pending patent applications: “GAMING DEVICE WITH MULTI-PURPOSE REELS,” Ser. No. 09/606,733, “GAMING DEVICE WITH MOVING SCREEN SIMULATION,” Ser. No. 09/625,884, “GAMING DEVICE WITH SIGNIFIED REEL SYMBOLS,” Ser. No. 09/605,344, “GAMING DEVICE HAVING TOUCH ACTIVATED ALTERNATING OR CHANGING SYMBOL,” Ser. No. 09/602,331, “GAMING DEVICE PROVIDING TOUCH ACTIVATED SYMBOL INFORMATION,” Ser. No. 09/680,349, “GAMING DEVICE HAVING A CHANGEABLE OBJECT,” Ser. No. 09/680,111, “GAMING DEVICE HAVING INTERACTING SYMBOLS,” Ser. No. 09/686,308, and “GAMING DEVICE HAVING A SYMBOL COVERING FEATURE,” Ser. No. 09/684,275.

COPYRIGHT NOTICE

A portion of the disclosure of this patent document contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which displays traveling symbols on its reels.

BACKGROUND OF THE INVENTION

The games in many existing gaming machines, such as traditional slot machines, are based upon the concept of spinning reels. The player initiates the spin of the reels, and where the reels stop determines whether a player wins a value and, if so, how much value the player wins. These gaming machines typically have certain features designated for outcomes such as when a player wins a value, advances to a bonus round or when the game terminates. For example, these gaming machines often display the amount of credits earned, flash lights, make sounds or have other features designed to draw attention to the outcome and entertain the player. In an existing game when a predetermined event occurs, a wild card-type symbol replaces various reel symbols, one at a time. If any of those replacements result in a winning combination of symbols, the player wins a certain value. Patent Cooperation Treaty Patent No. W0 9732285 entitled, “Slot Machine Game with Roaming Wild Card,” published on Apr. 9, 1997 and assigned on its face to Aristocrat Leisure Ind Pty Ltd discloses a feature generally of this type. However, these existing features do not display symbols as they move or travel from one position to another on the reels.

To increase player enjoyment and excitement, it is desirable to provide players with new features for gaming devices which use reels, where the new features involve symbols which travel on the reels.

SUMMARY OF THE INVENTION

The present invention overcomes the above shortcomings by providing a gaming device and method which includes a plurality of reels, preferably video reels and a plurality of symbols on the reels. The reels are preferably adjacent to one another. Functionally, a plurality of the reels spin, come to a stop and display one or more symbols. One or more reels may not spin and may function solely as a display screen. The term display, as used herein, includes but is not limited to showing, performing or otherwise representing a person, place or thing, at rest or in motion, visually and/or audibly.

The symbols which are displayed on each reel in relation to each other form a combination of symbols. When a player causes or reaches certain events, symbols or combinations of symbols (hereafter referred to as “triggering events”) in a primary game or bonus round, the computer of the gaming device provides certain outcomes, such as providing the player with value or bonus value, providing the player with the opportunity to gain values or bonus values, deducting values or bonus values from the player, terminating the primary game or bonus round, otherwise generating an event or determining the outcome of the primary game or bonus round.

As a result of one or more triggering events at any time during a primary game or bonus round, but preferably immediately before or after any of these outcomes occurs, one or more symbols (hereinafter referred to as a “traveling symbol”) travels from one location on a reel to another location on the same reel or a different reel. It should be appreciated that the present invention can be adapted to enable the player to control which traveling symbol will travel and where it will travel. Preferably, the computer animates the traveling symbols when they travel. The term animate, as used herein, includes but is not limited to, moving in any direction, simulating actual movement, operation or behavior, bending, transforming into a different shape or size, separating into different parts, expanding or contracting, changing colors, shades or patterns, illuminating, making sounds or otherwise having dynamic characteristics.

It is also preferable that immediately before the traveling symbol begins to travel, during the travel or when the traveling symbol reaches its destination, the computer may display or perform certain exhibitions involving: the traveling symbol, any of the other symbols, reels or any other persons, places or things which are graphically displayed on the reels. The term exhibition, as used in this specification, includes but is not limited to any audio, visual or audiovisual representation of a person, place or thing in motion or at rest, including video images, graphics, activities, animations, virtual representations, simulations or movement.

Depending upon when the travel feature of the present invention is used in relation to a game outcome, a variety of predetermined events may occur after the travel and any exhibitions are complete. For example, the game can provide the player with values or bonus values, deduct values or bonus values or terminate the primary game or bonus round. In any case, the travel feature of the present invention provides players with engaging and enjoyable entertainment.

In one preferred embodiment, when a certain triggering event occurs, the computer displays at least two traveling symbols at different locations on one or more reels. The traveling symbols move towards one another, accompanied by various exhibitions. This preferred embodiment can be included in a primary game and/or bonus round.

Preferably in this preferred embodiment, the symbols are vehicles moving towards one another on a collision path. Also, all symbols and graphics between the two vehicles are removed and replaced with a hand. The hand is located midway between the two vehicles. Before a collision occurs, the hand holds up a traffic stop sign, and the vehicles stop traveling. The computer then replaces the stop sign with the numeric value gained by the player.

In another embodiment, the triggering event is the player choosing at least one selectable symbol displayed on the reels. When the player chooses this selectable symbol, a predetermined symbol travels towards another predetermined symbol on the reels. When the traveling symbol reaches its destination, it interacts with the symbol it reached. This preferred embodiment can also be included in a primary game and/or bonus round.

Preferably, in this embodiment the selectable symbol is a food item located on a reel. When the player selects the food item, a predetermined character travels from its location to another symbol. The computer animates the character when it travels. Also, the computer performs an exhibition when the character reaches the destination symbol. The exhibition involves interaction between the traveling character and the symbol which it reached. In an alternative embodiment, when the player selects any symbol, except for the traveling character, the traveling character travels from its location to the food item. The computer animates the traveling character and also includes an exhibition involving this character and the food item (i.e., an exhibition of the character eating the food).

The gaming device feature of the present invention includes reels which display a variety of symbols. When one or more triggering events occurs in a game or bonus round, such as the player reaching a predetermined combination of symbols, one or more symbols travels from one location on one reel to another location on another reel. The traveling is accompanied by entertaining animations and exhibitions for the player's amusement.

It is therefore an object of the present invention to provide a gaming device with reels which includes traveling symbols.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
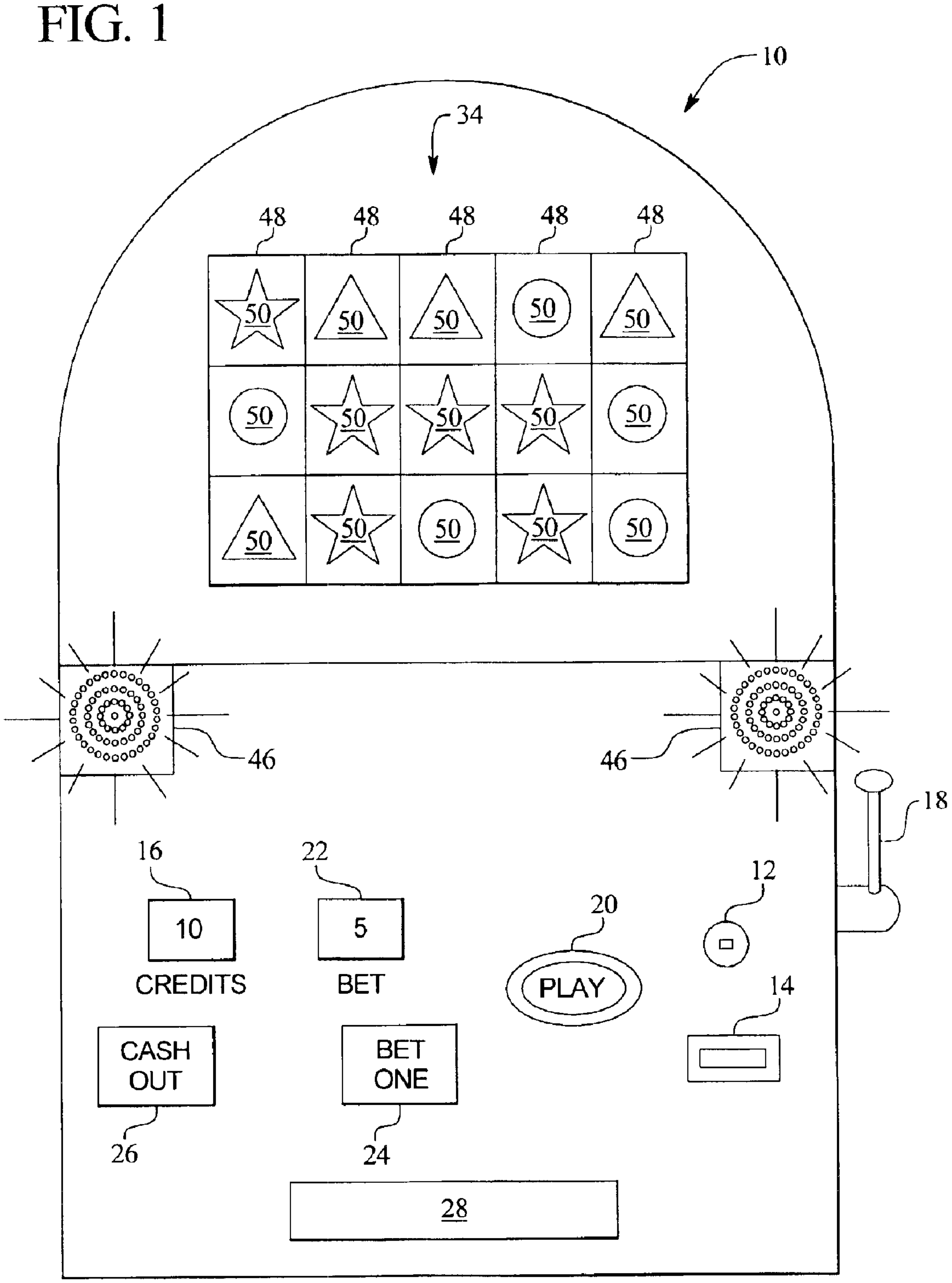
FIG. 1 is a front plan view of one embodiment of the gaming device of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any triggering combination. The indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Figure 2:
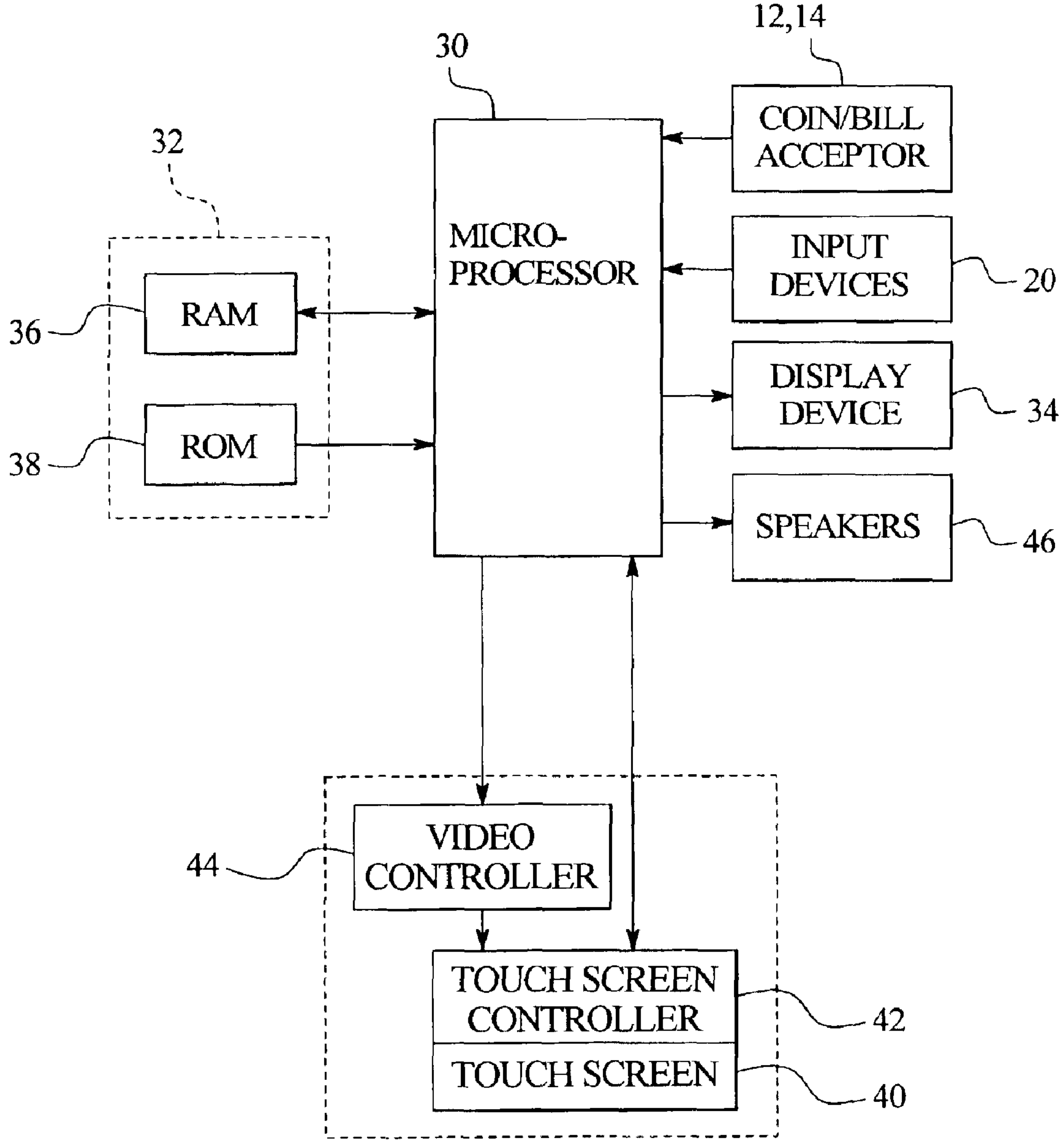
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 30, a memory device 32 for storing program code or other data, a video monitor or other display device 34 (i.e., a liquid crystal display) and at least one input device such as play buttons 20. The processor 30 is preferably a microprocessor or microcontroller-based platform which is capable of displaying and exhibiting images, symbols and other indicia such as images of people, characters, places, things and faces of cards. The memory device 32 can include random access memory (RAM) 36 for storing event data or other data generated or used during a particular game. The memory device 32 can also include read only memory (ROM) 38 for storing program code which controls the gaming device 10 so that it plays a particular game in accordance with applicable game rules and pay tables.

As illustrated in FIG. 2, the player preferably uses play buttons 20 to input signals into gaming device 10. Furthermore, it is preferable that touch screen 40 and an associated touch screen controller 42 are used instead of a conventional video display device 34. Touch screen 40 and touch screen controller 42 are connected to a video controller 44 and processor 30. A player can make decisions and input signals into the gaming device 10 by touching touch screen 40 at the appropriate places. As further illustrated in FIG. 2, the processor 30 can be connected to coin slot 12 or bill acceptor 14. The processor 30 can be programmed to require a player to deposit a certain amount of money in order to start the game. Furthermore, gaming device 10 preferably includes speakers 46 for making sounds or playing music consistent with the theme of the game and bonus scheme.

It should be appreciated that although a processor 30 and memory device 32 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 30 and memory device 32 preferably reside on each gaming device 10 unit, it is possible to provide some or all of their functions at a central location such as a network server for communication to a playing station such as over a local area network (LAN), wide area network (WAN), Internet connection, microwave link, and the like. The processor 30 and memory device 32 are generally referred to herein as the "computer."

Traveling Symbol Feature

With reference to FIGS. 1 and 2, display device 34 contains a plurality of reels 48, preferably five reels in mechanical, video or virtual form. Preferably, reels 48 are in video or virtual form. Each reel 48 exhibits a plurality of symbols 50 such as letters, characters, bells, hearts, fruits, numbers, bars, things or other images which preferably correspond to a theme associated with the gaming device 10.

In primary games and in bonus rounds, when certain predetermined triggering events occur, one or more traveling symbols 52 travels from one location on a reel to another location on the same reel or another reel. A traveling symbol 52 can travel to another traveling symbol 52, any other symbol 50, any location or anything else. A traveling symbol 52 is any symbol which relocates or travels from one location on a reel 48 to another. Preferably, but not necessarily, traveling symbols 52 are representations of characters or things which have the ability to travel.

In operation, a player makes payment to the gaming device and the primary game begins, enabling the player to spin the reels 48. The player then uses play buttons 20 or any other activator to cause the reels 48 to spin, as indicated by block 54 in FIG. 3. The player spins the reels 48 in this manner until running out of credits or reaching a triggering event. If the player reaches certain triggering events in the primary game, a variety of outcomes may occur. One possible outcome is the computer may initiate a bonus round. Triggering events can occur in bonus rounds as well.

Figure 3:
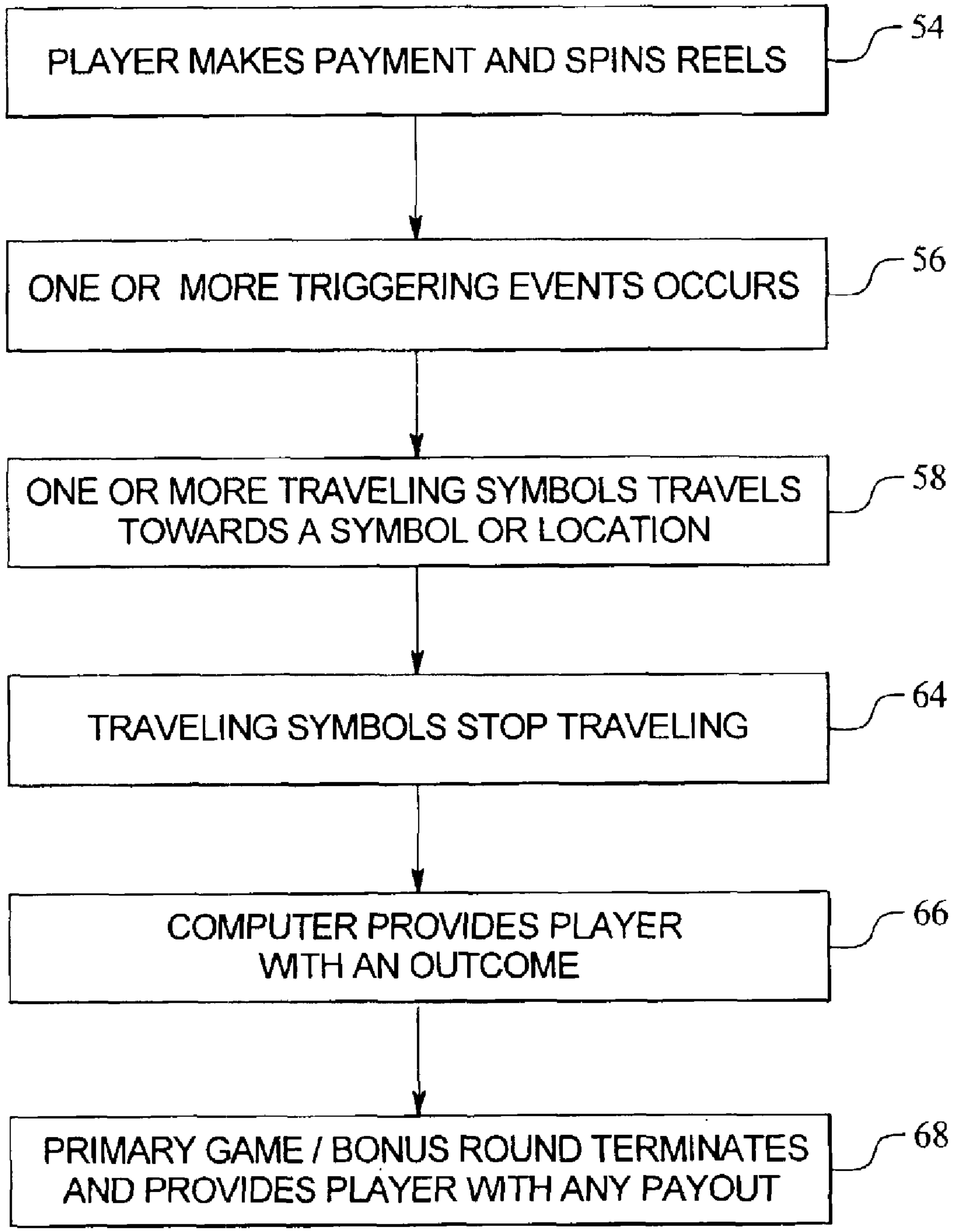
FIG. 3 is a flow diagram of one embodiment of the present invention.

Whether in a primary game or bonus round, one or more triggering events may occur, as indicated by block 56 in FIG. 3. When a player reaches one or more predetermined triggering events, such as the player achieving a winning combination of symbols 50 and/or the player making a selection of a certain symbol 50, the computer causes one or more traveling symbols 52 (shown in FIGS. 4 through 14) to travel on the reels 48. The traveling symbols 52 can travel to or towards predetermined symbols 50, traveling symbols 52 or certain locations, as indicated by block 58 in FIG. 3. These traveling symbols 52 can be symbols 50 which were displayed when the triggering event occurred, or they can be new symbols which the computer used to replace certain existing symbols 50. It should be appreciated that the present invention can be adapted to enable the player to control the traveling. For example, the computer can enable the player to choose which symbol(s) will travel, their destinations or a combination thereof. The player can make these choices by touching the touch screen 40 at the location adjacent to the symbols 50 which the player desires to move and/or the location adjacent to the desired destination.

In one embodiment when a triggering event occurs, one or more traveling symbols 52 travels to different locations on the reels 48 and to different symbols 50 in various manners and in various scenarios. Certain of these manners and scenarios are illustrated in FIGS. 4 through 8. It should be appreciated, however, that other manners of traveling and other scenarios are contemplated by the present invention.

Figure 4:
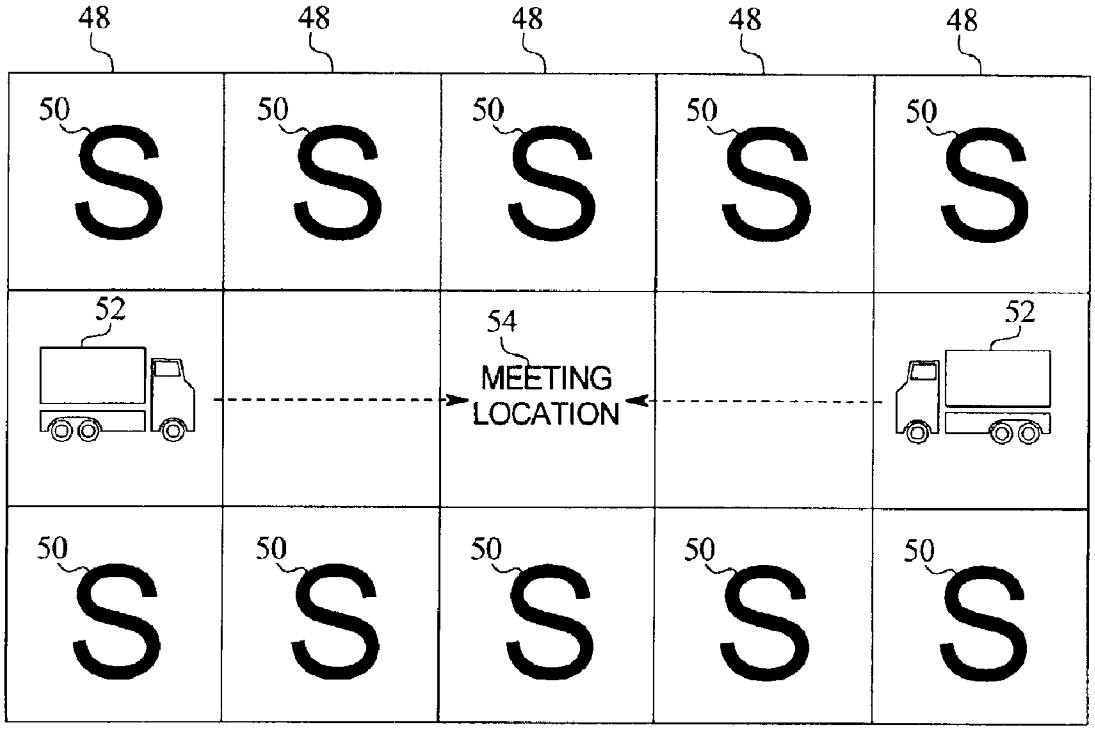
FIG. 4 is a top plan view of the reels, symbols and traveling symbols in one embodiment of the present invention.

As illustrated in FIG. 4, the computer can display two traveling symbols 52, apart from one another at certain locations on certain reels 48. Here, symbols 52 are shown as trucks. Preferably, the computer removes all symbols 50 and graphics between the two traveling symbols 52. It is also preferable that the computer displays or performs certain exhibitions (not shown) on the reels 48, preferably between the traveling symbols 52. After these exhibitions, if any, the computer causes the traveling symbols 52 to travel across reels towards one another. They can meet anywhere, but preferably the traveling symbols 52 meet at or near a meeting location 54, as illustrated in FIG. 4. A meeting location 54 can be any location positioned between two or more traveling symbols 52 which are traveling towards each other and where each symbol stops traveling when it reaches this location.

Figure 5:
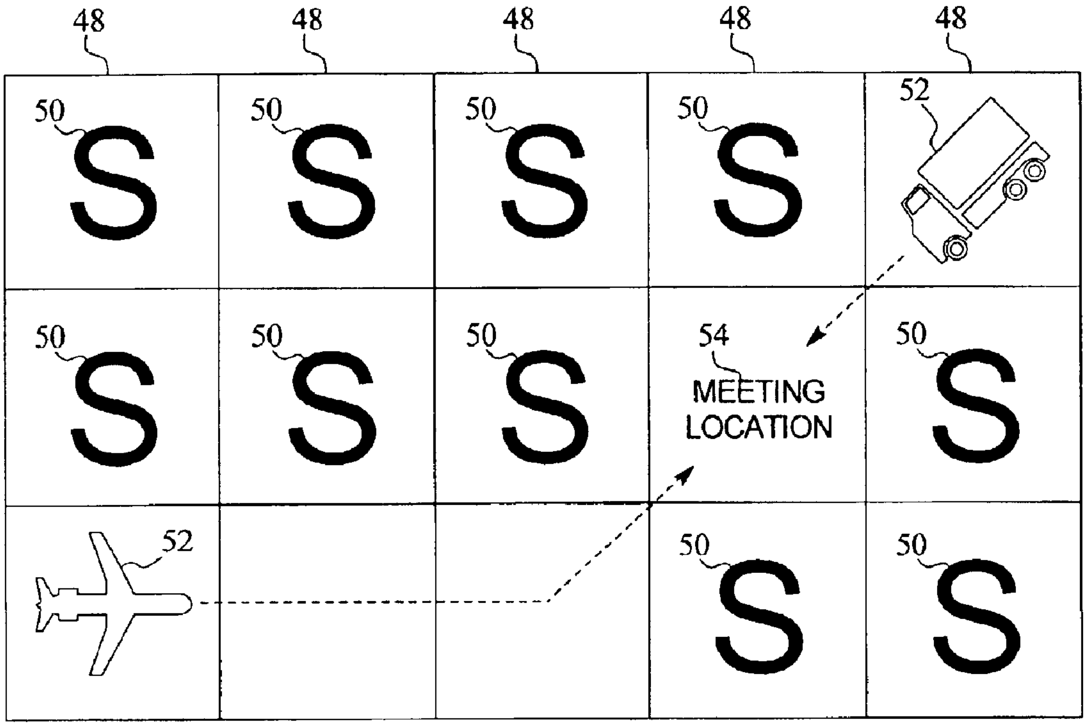
FIG. 5 is a top plan view of the reels, symbols and traveling symbols in another embodiment of the present invention.

The traveling symbols 52 can travel in any manner, such as in straight lines, curved lines or by disappearing from locations and reappearing at new locations. As illustrated in FIG. 5, two traveling symbols 52 are headed towards a predetermined meeting location 54. The traveling symbol 52 located in the far left reel 48 is illustrated as an airplane, and the traveling symbol 52 located in the far right reel 48 is illustrated as a truck. The airplane traveling symbol 52 travels past two locations formerly occupied by symbols 50 and then travels to the meeting location 54. The truck traveling symbol 52 travels directly to the meeting location 54, where it meets the airplane traveling symbol 52.

Figure 6:
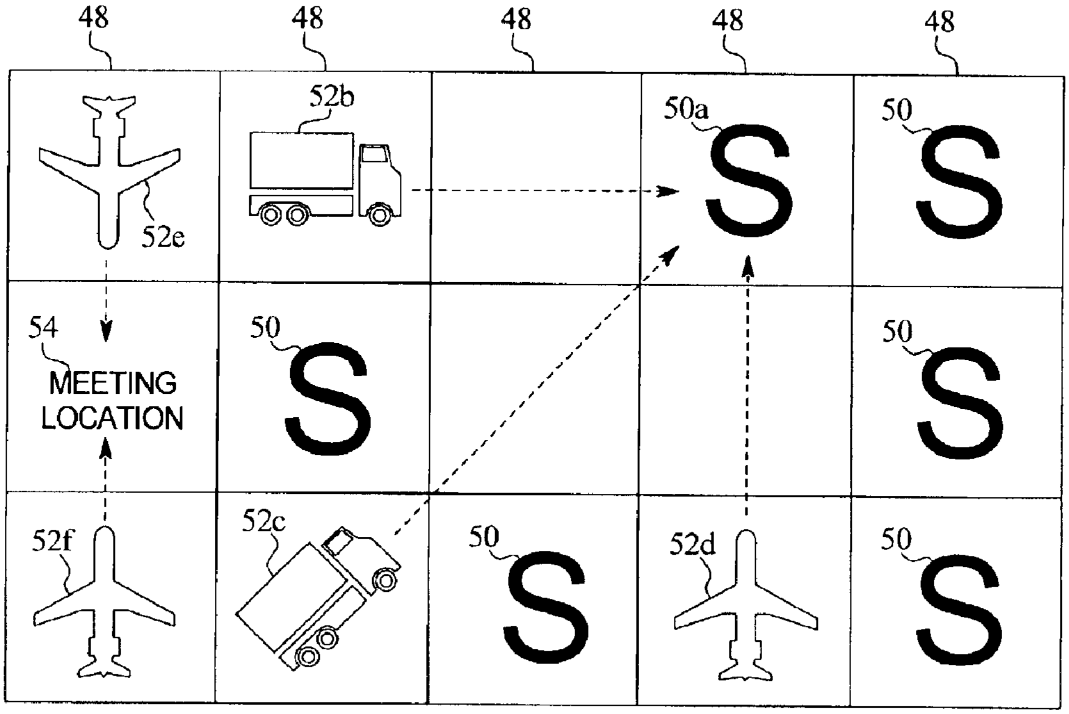
FIG. 6 is a top plan view of the reels, symbols and traveling symbols with multiple travels in one embodiment of the present invention.

Furthermore, traveling symbols 52 are not limited to traveling towards meeting locations 54 or other traveling symbols 52. Traveling symbols 52 can travel towards non-traveling symbols 50 as well. As illustrated in FIG. 6, two truck traveling symbols 52 and one airplane traveling symbol 52 travel towards a symbol 50*a*. These three symbols will stop traveling when they reach the destination symbol 50*a*.

Also as illustrated in FIG. 6, multiple travels can occur on a single set of reels 48. As just described, one travel illustrated in FIG. 6 involves two truck travel symbols 52*b* and 52*c* and one airplane travel symbol 52*d*. A different travel on the same set of reels involves two airplane travel symbols 52*e* and 52*f* traveling towards a meeting location 54. When these two symbols reach the meeting location 54, they will stop traveling.

Figure 7:
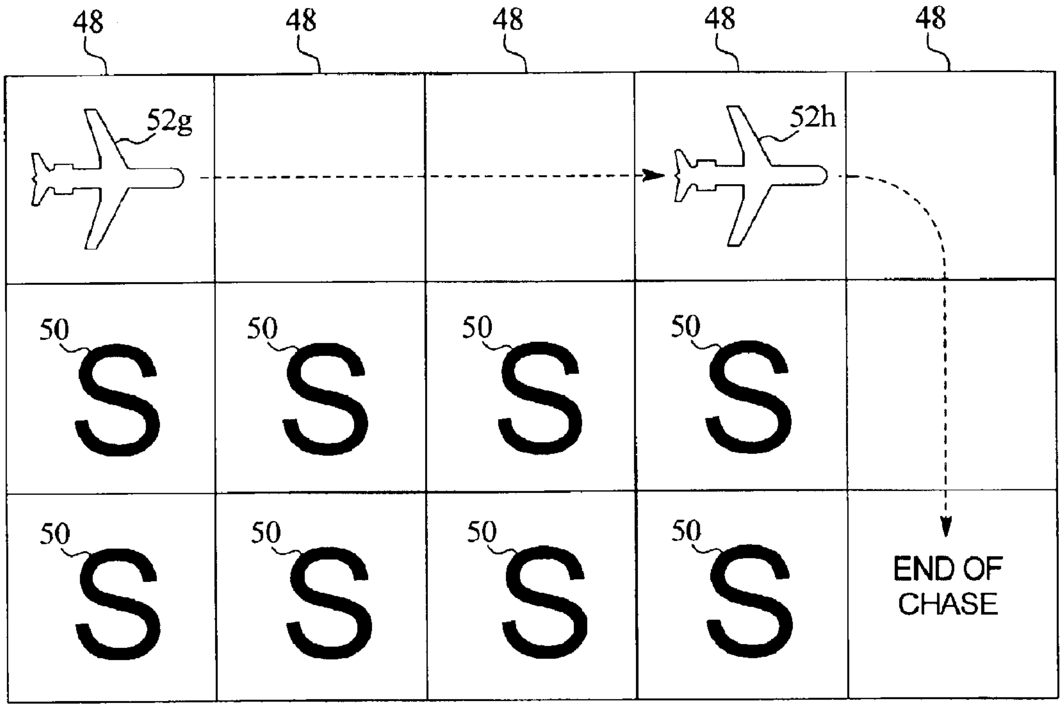
FIG. 7 is a top plan view of the reels, symbols and traveling symbols involved in a chase in one embodiment of the present invention.

In addition, one or more traveling symbols 52 can be chasing one another. As illustrated in FIG. 7, one airplane travel symbol 52*g* is pursuing or chasing another airplane travel symbol 52*h*. Preferably, the chase terminates at a predetermined location on the reels 48, as indicated with the message, "end of chase" in FIG. 7. If the chasing symbol catches the chased symbol before the chased symbol reaches this location, the traveling preferably terminates. Whether or not the chased symbol will be caught is predetermined by the computer.

Figure 8:
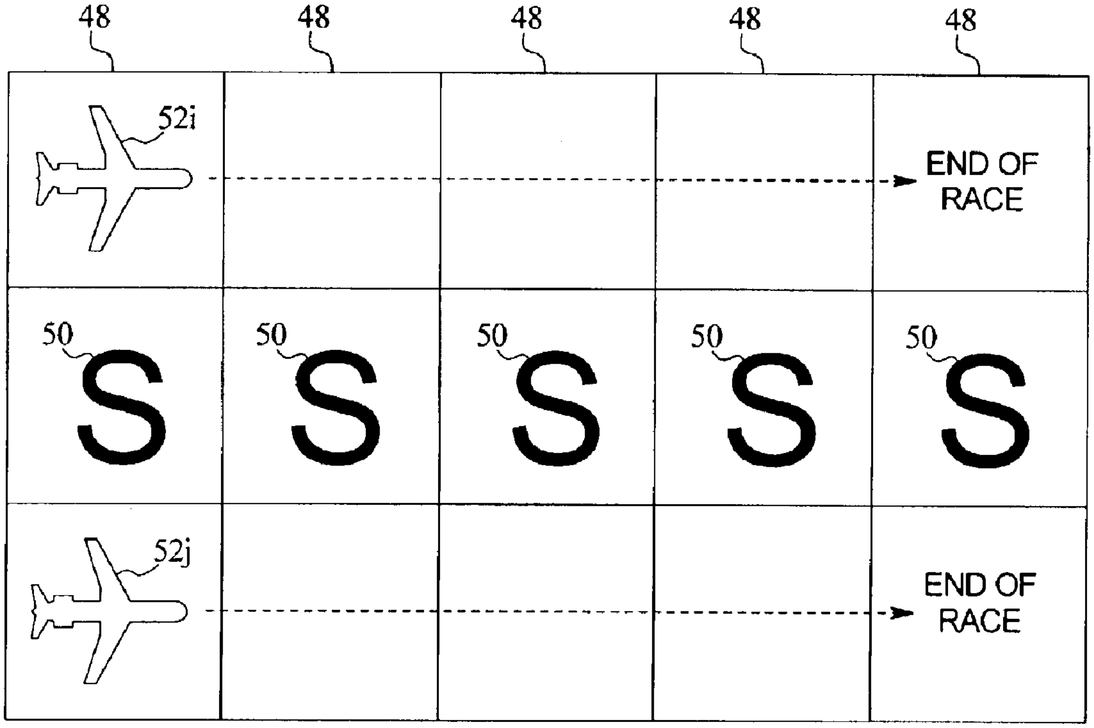
FIG. 8 is a top plan view of the reels, symbols and traveling symbols involved in a race in one embodiment of the present invention.

Two or more traveling symbols can be involved in a race. As illustrated in FIG. 8, two airplane traveling symbols 52*i* and 52*j* are racing against one another. The race begins at the far left reel 48 and preferably ends at a predetermined location, such as the far right reel 48. This predetermined end location is indicated in FIG. 8 with the message, "end of race." The path of the race can be any shape such as linear as illustrated in FIG. 8 or cyclical. If the path is cyclical, the race can involve several laps on the reels 48.

Figure 9:
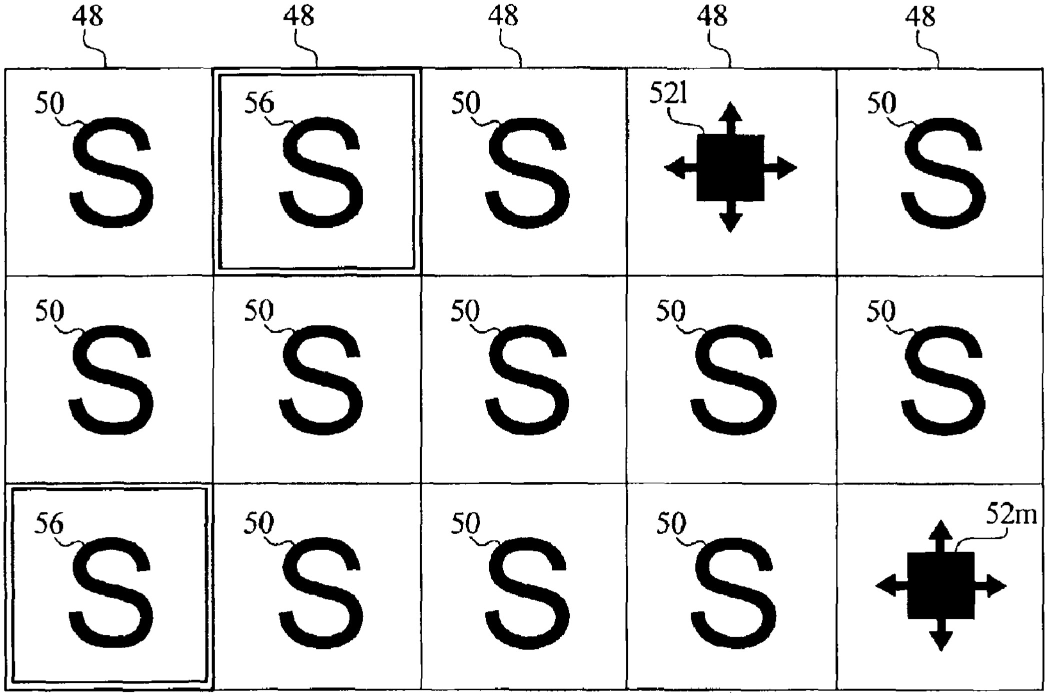
FIG. 9 is a top plan view of the reels, symbols, traveling symbols and selectable symbols in the first screen of one embodiment of the present invention.
Figure 10:
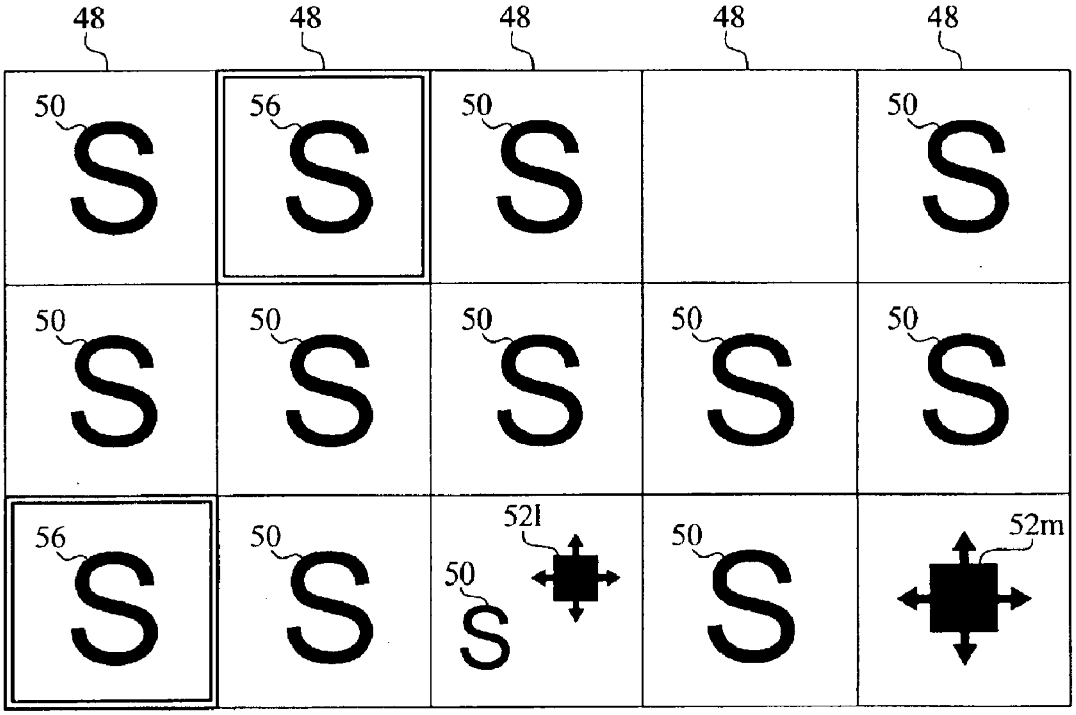
FIG. 10 is a top plan view of the reels, symbols, traveling symbols and selectable symbols in the second screen of the same embodiment of the present invention.

In another embodiment, after two triggering events occur sequentially, the traveling begins. The first event is the player reaching a winning combination of symbols 50 in the primary game. The computer initiates a bonus round. Then the computer enables the player to choose a selectable symbol 56, preferably from a plurality of selectable symbols 56, as shown in FIG. 9. The player's selection is the second triggering event. The player makes a selection by touching touch screen 40 (shown in FIG. 2) at the area adjacent to a selectable symbol 56. The selectable symbols 56 are preferably distinguished from the other symbols 50, such as through a shaded border, as shown in FIGS. 9 and 10. Two traveling symbols 52*l* and 52*m* are also illustrated as multidirectional arrows in FIGS. 9 and 10.

When the player chooses a selectable symbol 56, at least one traveling symbol travels to a new location on the reels 48. In the example shown in FIGS. 9 and 10, a player chooses the selectable symbol 56 located in the far left reel 48. Next as illustrated in FIG. 10, the traveling symbol 52*l* located in the first reel 48 from the right, travels to the symbol 50 located in the third reel 48 from the left. Preferably, at the location of this symbol 50, the computer performs an exhibition involving interaction between this symbol 50 and the traveling symbol 52*l*.

Referring back to FIG. 3, in both of these preferred embodiments and in any scenario the traveling eventually stops, and the computer provides the player with an outcome, as indicated by blocks 64 and 66. The type of outcome depends upon the type of triggering event which occurred and the predetermined program of the computer. An example outcome in either a primary game or bonus round could be awarding the player with a value or bonus value. If the outcome is a termination, the primary game or bonus round, will of course terminate. If the outcome is not a termination, the player can continue playing until the player cashes out or runs out of credits, in which case the primary game or bonus round will terminate. After termination, the gaming device will provide the player with any credits or payout gained by the player as indicated by block 68.

In addition, it is preferable that when the traveling symbols 52 travel, the computer animates the traveling symbols 52. For example, the computer can cause a truck to appear to be moving accompanied by rotating wheels, exhaust exiting the truck and the common sound of a truck engine. Furthermore, it is preferable that the computer includes one or more exhibitions before, during or after the traveling symbols 52 complete their travel. Preferably, the exhibitions are related to a theme shared by the symbols 50, traveling symbols 52 and the overall primary game or bonus round. The computer can display or perform the exhibitions anywhere on the reels 48, and the exhibitions can involve one or more symbols 50, traveling symbols 52 or any person, place or thing graphically represented on the reels 48, and any animation or interaction involving these symbols.

Figure 11:
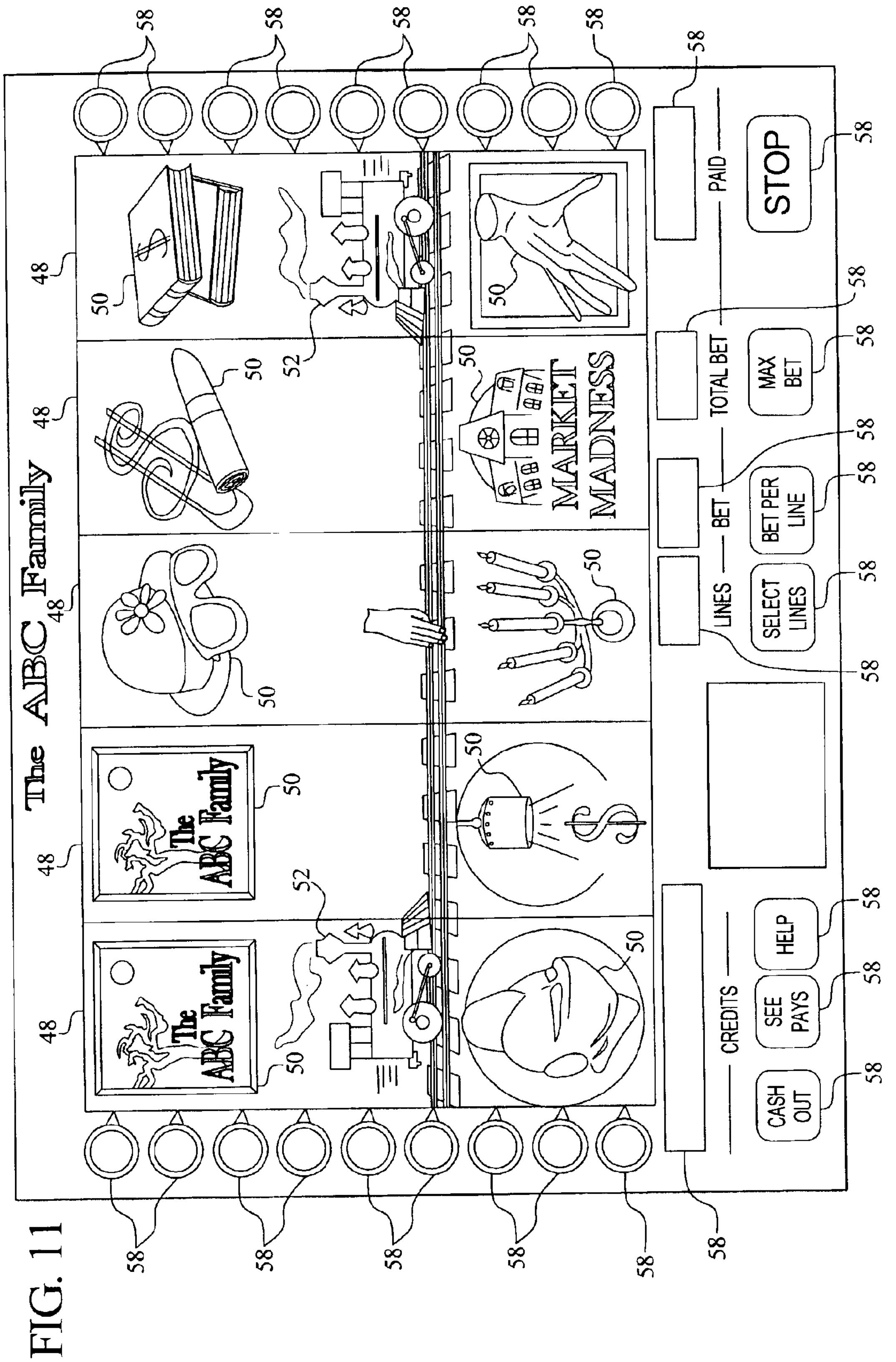
FIG. 11 is a top plan view of the reels, symbols and traveling symbols in the first screen shot of another embodiment of the present invention.
Figure 12:
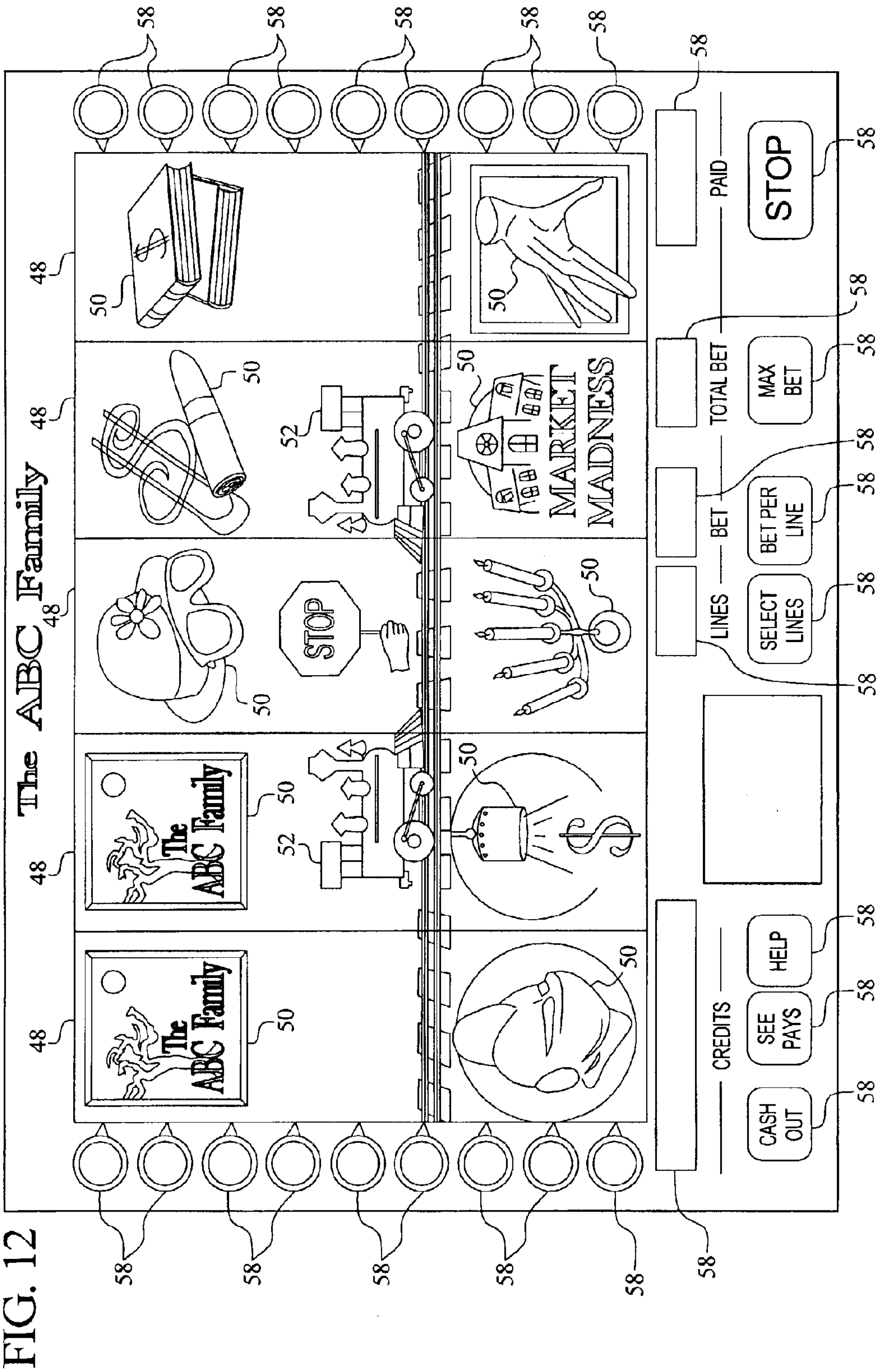
FIG. 12 is a top plan view of the reels, symbols and traveling symbols in the second screen shot of the same embodiment of the present invention.
Figure 13:
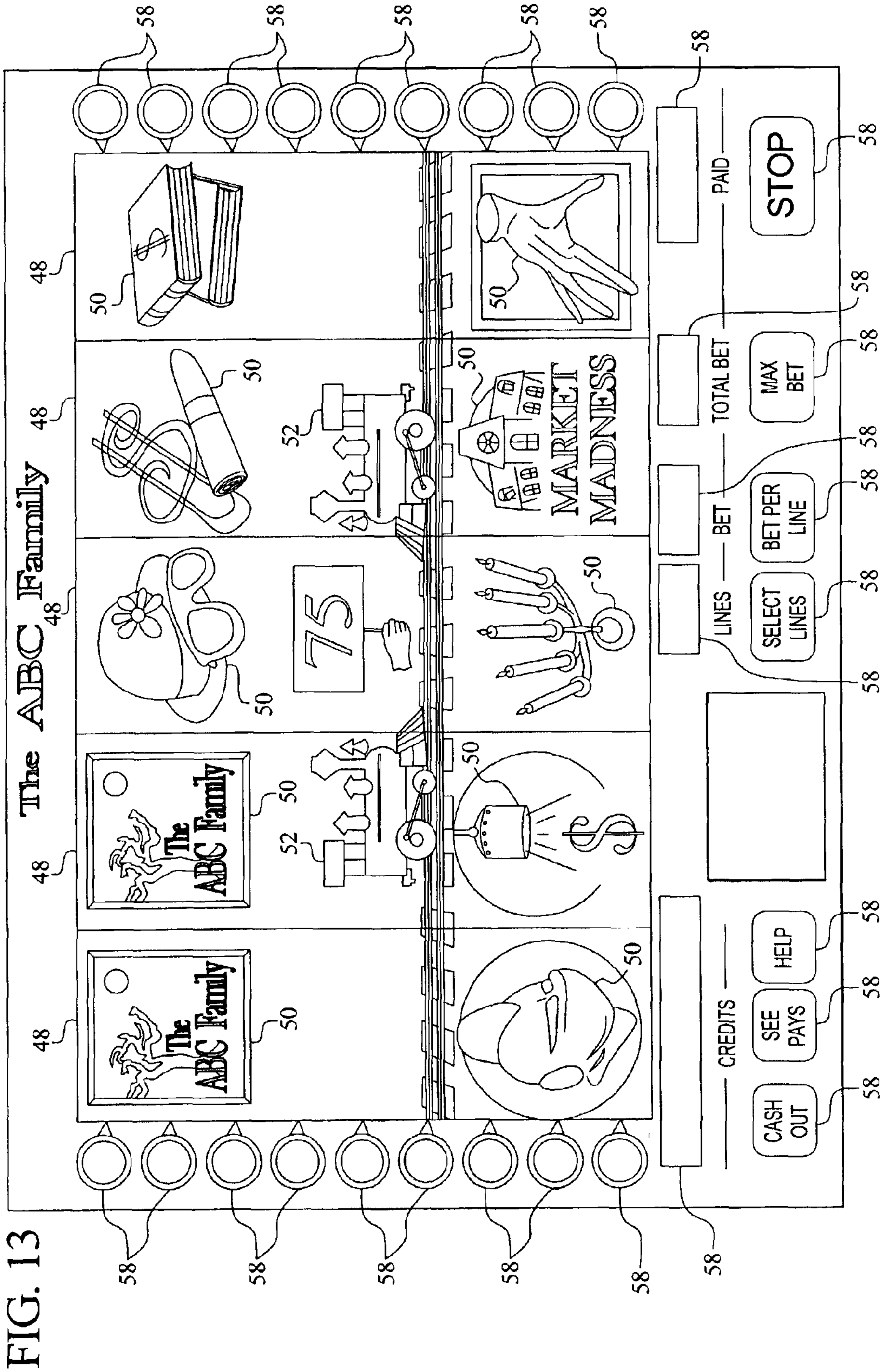
FIG. 13 is a top plan view of the reels, symbols and traveling symbols in the third screen shot of the same embodiment of the present invention.

In another preferred embodiment, shown in FIG. 11, the traveling symbols 52 are trains, preferably two trains traveling towards each other. When the triggering event occurs, in the first screen shot the computer displays the two trains at different locations on the reels 48, as shown in FIG. 11. The computer also displays exhibitions between the two trains. The exhibitions include a railroad track and a human hand. In the second screen shot shown in FIG. 12, as the trains approach each other, the human hand holds up a traffic stop sign, and the trains stop traveling when they reach the sign. Finally in the third screen shot shown in FIG. 13, the computer replaces the stop sign with a sign which bears a numeral. This numeral informs the player of the amount of value or bonus value gained by the player. As shown in FIGS. 11 through 13, this preferred embodiment of the gaming device feature of the present invention preferably incorporates the theme of The Addams Family™ television series. ADDAMS FAMILY™ is a trademark of Barbara Artists, Inc., New York, N.Y. and is used by the assignee of the present invention with permission from a licensee of this trademark, Monaco Entertainment Corporation.

Figure 14:
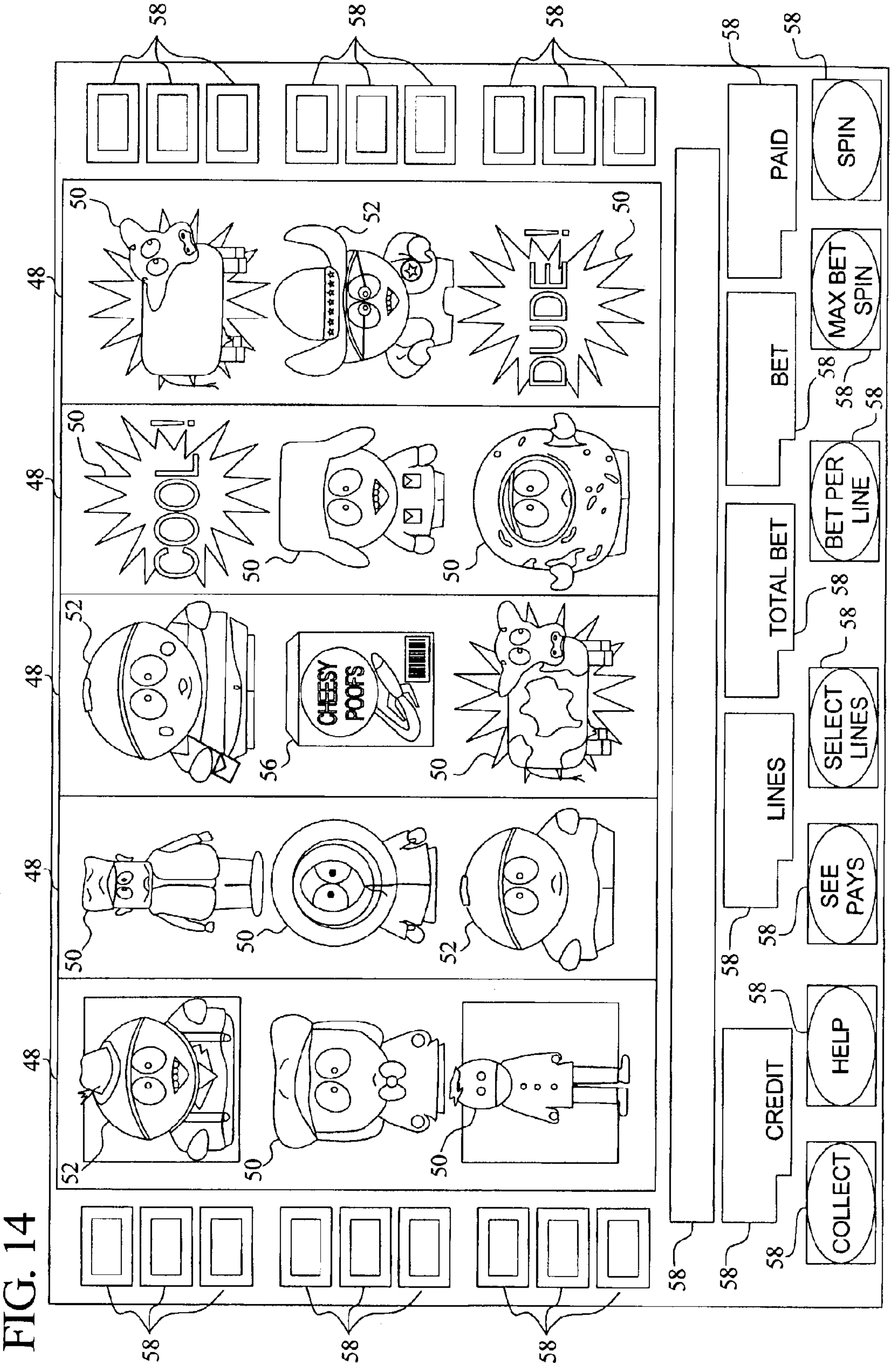
FIG. 14 is a top plan view of the reels, symbols, traveling symbols and selectable symbols in yet another embodiment of the present invention.

In yet another preferred embodiment of the present invention shown in FIG. 14, several symbols 50 are characters and others are messages. This embodiment also includes four traveling symbols 52 which are also characters, and one selectable symbol 56 which is a food item. When the player touches the area on the touch screen 40 (shown in FIG. 2) which is adjacent to the food item, one of the traveling symbol characters moves towards another character. When the traveling symbol character reaches the other character, they interact. In an alternative embodiment, when a player touches any area on the display device adjacent to any symbol 50, except for a traveling symbol 52, one of the traveling symbols 52 moves towards the food item and interacts with the food item.

As shown in FIG. 14, this preferred embodiment of the present invention preferably incorporates the South Park™ cartoon theme. SOUTH PARK™ is a trademark and service mark of Comedy Partners, New York, N.Y., and is used with permission from Comedy Partners by the assignee of the present invention.

In these two preferred embodiments involving the themes of The Addams Family™ series and South Park™ cartoon, the gaming device includes various windows 58, shown in FIGS. 11 through 14. These windows 58 allow the player to select certain game options (i.e., bet options), enable the player to operate the game and generally provide information to the player, such as the amount of value and credit the player gained.

The gaming device feature of the present invention includes various symbols which travel from one location to another on the gaming device reels. These symbols make their travel preferably before or after an outcome occurs, such as before the player receives an award value. The traveling symbols move and interact with other reel symbols as part of an exhibition which engages and entertains the player.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

What is claimed is:

1. A gaming device comprising:

a primary game operable upon a wager by a player, the primary game including a plurality of reels;

a plurality of symbols on each of said reels, each of the symbols having a designated position on the reels, whereby when each of the reels moves, said symbols on said reels move, the movement of the reels causing different combinations of the symbols to be displayed to the player during multiple plays of the primary game;

a plurality of values awardable to the player, each of said values associated with a different one of the combinations of symbols;

at least one bonus triggering event occurring when a designated one of the symbols or a designated one of the combinations of symbols is displayed in the primary game;

a bonus round initiated by the bonus triggering event;

at least one bonus value greater than zero awardable to the player, the bonus value associated with the bonus triggering event;

a graphical representation displayed in the bonus round, the graphical representation including at least one of said symbols traveling on said reels toward at least one destination on one of said reels;

a display device which displays the reels, the symbols and the graphical representation;

a processor in communication with the display device which causes the display device to display said graphical representation after said bonus triggering event occurs; and a payout available to the player, the payout based on: (a) any of the values awarded to the player in the primary game; and (b) the bonus value awarded to the player, if any.

2. The gaming device of claim 1, wherein the graphical representation includes: (a) the traveling symbol traveling along a line on the reels; and (b) removal of at least a portion of one of the symbols located on the line between the traveling symbol and the destination.

3. The gaming device of claim 1, wherein the graphical representation is selected from the group consisting of a graphical representation including at least one of the symbols traveling from one of the designated positions on one of the reels to a different position on any portion of said reel, a graphical representation including at least one of the symbols traveling from one of the designated positions on one of the reels to a portion of a different reel, a graphical representation including at least one of the symbols traveling from one of the designated positions on one of the reels to a position between a plurality of the reels and a graphical representation including at least one of the symbols traveling from one of the designated positions on one of the reels to a position adjacent to any one of the reels.

4. The gaming device of claim 1, which includes an animation produced by the display device, the animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation of transformation into a different shape, an animation of transformation into a different size, an animation of separating into different parts, an animation of expanding, an animation of contracting, an animation of changing colors, an animation of changing shades, an animation of changing patterns and an animation including illumination.

5. The gaming device of claim 1, which includes a speaker in communication with the display device, the speaker and the display device producing an animation selected from the group consisting of an animation including sound and an audio-visual animation including any one of the symbols.

6. The gaming device of claim 1, which includes a graphical change displayed by the display device, the graphical change selected from the group consisting of a graphical change including a removal of any one of the symbols, a graphical change including a removal of a background image associated with any one of the symbols and a graphical change including a removal of at least one image between a plurality of the reels.

7. The gaming device of claim 1, wherein the display device has an electronic configuration adapted to receive input through a network selected from the group consisting of a playing station network, a local area network, a wide area network and an internet.

8. A gaming device comprising:

a primary game operable upon a wager by a player, the primary game including a plurality of reels;

a plurality of symbols on each of said reels, each of the symbols having a designated position on the reels, whereby when each of the reels moves, said symbols on said reels move, the movement of the reels causing different combinations of the symbols to be displayed to the player during multiple plays of the primary game;

a plurality of values awardable to the player, each of said values associated with a different one of the combinations of symbols;

at least one bonus triggering event occurring when a designated one of the symbols or a designated one of the combinations of symbols is displayed in the primary game;

a bonus round initiated by the bonus triggering event;

at least one bonus value greater than zero awardable to the player, the bonus value associated with the bonus triggering event;

a display device which displays the reels, the symbols and which displays at least one of the symbols traveling on the reels toward at least one destination on one of the reels after the bonus triggering event occurs; and a payout available to the player, the payout based on: (a) any of the values awarded to the player in the primary game; and (b) the bonus value awarded to the player, if any.

9. The gaming device of claim 8, which includes a graphical representation displayed by the display device, the graphical representation including: (a) the traveling symbol traveling along a line on the reels; and (b) removal of at least a portion of one of the symbols located on the line between the traveling symbol and the destination.

10. The gaming device of claim 8, wherein the destination has a location selected from the group consisting of a location on any portion of the reel from which the symbol travels, a location on any portion of one of the reels other than the reel from which the symbol travels, a location between a plurality of the reels and a location adjacent to one of the reels.

11. The gaming device of claim 8, which includes an animation produced by the display device, the animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation of transformation into a different shape, an animation of transformation into a different size, an animation of separating into different parts, an animation of expanding, an animation of contracting, an animation of changing colors, an animation of changing shades, an animation of changing patterns and an animation including illumination.

12. A gaming device comprising:

a slot game operable upon a wager by a player, the slot game including a plurality of video reels;

a plurality of symbols on each of the video reels, each of said symbols having a designated position on the video reels, whereby when each of the video reels moves, said symbols on said video reels move, the movement of the video reels causing different combinations of the symbols to be displayed to the player during multiple plays of the slot game;

a plurality of values awardable to the player, each of the said values associated with a different one of the combinations of symbols;

at least one bonus triggering event occurring when a designated one of the symbols or a designated one of the combinations of symbols is displayed in the slot game;

a bonus round initiated by the bonus triggering event;

at least one bonus value greater than zero awardable to the player, the bonus value associated with the bonus triggering event;

a graphical representation displayed in the bonus round, the graphical representation including a plurality of said symbols traveling on said video reels until a predetermined event occurs;

a display device which displays the video reels, the symbols and the graphical representation; and a processor in communication with the display device which causes the display device to display the graphical representation after the bonus triggering event occurs; and a payout available to the player, the payout based on: (a) any of the values awarded to the player in the slot game; and (b) the bonus value awarded to the player, if any.

13. The gaming device of claim 12, wherein the graphical representation includes: (a) the traveling symbol traveling along a line on the video reels; and (b) removal of at least a portion of one of the symbols located on the line between the traveling symbol and the destination.

14. The gaming device of claim 12, wherein the graphical representation is selected from the group consisting of a graphical representation including at least one of the symbols traveling from one of the designated positions on one of the video reels to a different position on any portion of said video reel, a graphical representation including at least one of the symbols traveling from one of the designated positions on one of the video reels to a portion of a different video reel, a graphical representation including at least one of the symbols traveling from one of the designated positions on one of the video reels to a position between a plurality of the video reels and a graphical representation including at least one of the symbols traveling from one of the designated positions on one of the video reels to a position adjacent to any one of the video reels.

15. The gaming device of claim 12, which includes an animation produced by the display device, the animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation of transformation into a different shape, an animation of transformation into a different size, an animation of separating into different parts, an animation of expanding, an animation of contracting, an animation of changing colors, an animation of changing shades, an animation of changing patterns and an animation including illumination.

16. The gaming device of claim 12, which includes a speaker in communication with the display device, the speaker and the display device producing an animation selected from the group consisting of an animation including sound and an audio-visual animation including any one of the symbols.

17. The gaming device of claim 12, which includes a graphical change displayed by the display device, the graphical change selected from the group consisting of a graphical change including a removal of any one of the symbols, a graphical change including a removal of a background image associated with any one of the symbols and a graphical change including a removal of at least one image between a plurality of the video reels.

18. The gaming device of claim 12, wherein the display device has an electronic configuration adapted to receive input through a network selected from the group consisting of a playing station network, a local area network, a wide area network and an internet.

19. A gaming device comprising:

a slot game operable upon a wager by a player, the slot game including a plurality of video reels;

a plurality of symbols on each of the video reels, each of said symbols having a designated position on the video reels, whereby when each of the video reels moves, said symbols on said video reels move the movement of the video reels causing different combinations of the symbols to be displayed to the player during multiple plays of the slot game;

a plurality of values awardable to the player, each of the said values associated with a different one of the combinations of symbols;

at least one bonus triggering event occurring when a designated one of the symbols or a designated one of the combinations of symbols is displayed in the slot game;

a bonus round initiated by the bonus triggering event;

at least one bonus value greater than zero awardable to the player, the bonus value associated with the bonus triggering event;

a display device which displays the video reels, the symbols and which, after the bonus triggering event occurs, displays a plurality of the symbols traveling on the reels until a predetermined event occurs; and a payout available to the player, the payout based on: (a) any of the values awarded to the player in the slot game; and (b) the bonus value awarded to the player, if any.

20. The gaming device of claim 19, which includes a graphical representation displayed by the display device, the graphical representation including: (a) the traveling symbols traveling along a line on the reels; and (b) removal of at least a portion of one of the symbols located on the line between the traveling symbols and the destination.

21. The gaming device of claim 19, wherein at least one of the traveling symbols has a destination selected from the group consisting of a destination on any portion of the video reel from which the symbol travels, a destination on any portion of one of the video reels other than the video reel from which the symbol travels, a destination between a plurality of the video reels and a destination adjacent to one of the video reels.

22. The gaming device of claim 19, which includes an animation produced by the display device, the animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation of transformation into a different shape, an animation of transformation into a different size, an animation of separating into different parts, an animation of expanding, an animation of contracting, an animation of changing colors, an animation of changing shades, an animation of changing patterns and an animation including illumination.

23. The gaming device of claim 19, which includes a speaker in communication with the display device, the speaker and the display device producing an animation selected from the group consisting of an animation including sound and an audio-visual animation including any one of the symbols.

24. The gaming device of claim 19, which includes a graphical change displayed by the display device, the graphical change selected from the group consisting of a graphical change including a removal of any one of the symbols, a graphical change including a removal of a background image associated with any one of the symbols and a graphical change including a removal of at least one image between a plurality of the video reels.

25. The gaming device of claim 19, wherein the display device has an electronic configuration adapted to receive input through a network selected from the group consisting of a playing station network, a local area network, a wide area network and an internet.

26. A gaming device comprising:

a primary game operable upon a wager, the primary game including a plurality of reels;

a plurality of symbols on each of said reels, each of said symbols having a designated position on the reels, whereby when each of the reels moves, said symbols on said reels move, the movement of the reels causing different combinations of the symbols to be displayed to the player during multiple plays of the primary game;

a plurality of values awardable to the player, each of said values associated with a different one of the combinations of symbols;

at least one bonus triggering event occurring when a designated one of the symbols or a designated one of the combinations of symbols is displayed in the primary game;

a bonus round initiated by the bonus triggering event;

at least one bonus value greater than zero awardable to the player, the bonus value associated with the bonus triggering event; a graphical representation displayed in the bonus round, the graphical representation including at least one of said symbols traveling from the designated position of said symbol to at least one destination on one of said reels;

a display device which displays the reels, the symbols and the graphical representation;

a processor in communication with the display device which, after the bonus triggering event occurs, causes the display device to display the graphical representation; and a payout available to the player, the payout based on: (a) any of the values awarded to the player in the primary game; and (b) the bonus value awarded to the player, if any.

27. The gaming device of claim 26, wherein the graphical representation includes: (a) the traveling symbol traveling along a line on the reels; and (b) removal of at least a portion of one of the symbols located on the line between the traveling symbol and the destination.

28. The gaming device of claim 26, wherein the destination is selected from the group consisting of a destination on any portion of the reel from which one of the symbols travels, a destination on any portion of one of the reels other than the reel from which one of the symbols travels, a destination between a plurality of the reels and a destination adjacent to one of the reels.

29. The gaming device of claim 26, which includes an animation produced by the display device, the animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation of transformation into a different shape, an animation of transformation into a different size, an animation of separating into different parts, an animation of expanding, an animation of contracting, an animation of changing colors, an animation of changing shades, an animation of changing patterns and an animation including illumination.

30. The gaming device of claim 26, which includes a speaker in communication with the display device, the speaker and the display device producing an animation selected from the group consisting of an animation including sound and an audio-visual animation including any one of the symbols.

31. The gaming device of claim 26, which includes a graphical change displayed by the display device, the graphical change selected from the group consisting of a graphical change including a removal of any one of the symbols, a graphical change including a removal of a background image associated with any one of the symbols and a graphical change including a removal of at least one image between a plurality of the reels.

32. The gaming device of claim 26, wherein the display device has an electronic configuration adapted to receive input through a network selected from the group consisting of a playing station network, a local area network, a wide area network and an internet.

33. A gaming device a comprising:

a primary game operable upon a wager, the primary game including a plurality of reels;

a plurality of symbols on each of said reels, each of said symbols having a designated position on the reels, whereby when each of the reels moves, said symbols on said reels move, the movement of the reels causing different combinations of the symbols to be displayed to the player during multiple plays of the primary game;

a plurality of values awardable to the player, each of said values associated with a different one of the combinations of symbols;

at least one bonus triggering event occurring when a designated one of the symbols or a designated one of the combinations of symbols is displayed in the primary game;

a bonus round initiated by the bonus triggering event;

at least one bonus value greater than zero awardable to the player, the bonus value associated with the bonus triggering event; a display device which displays the reels, the symbols and which, after the bonus triggering event occurs, displays at least one of said symbols traveling from the designated position of said symbol to at least one destination on one of said reels; and a payout available to the player, the payout based on: (a) any of the values awarded to the player in the primary game; and (b) the bonus value awarded to the player, if any.

34. The gaming device of claim 33, which includes a graphical representation displayed by the display device, the graphical representation including; (a) the traveling symbol traveling along a line on the reels; and (b) removal of at least a portion of one of the symbols located on the line between the traveling symbol and the destination.

35. The gaming device of claim 33, wherein the destination is selected from the group consisting of a destination on any portion of the reel from which one of the symbols travels, a destination on any portion of one of the reels other than the reel from which one of the symbols travels, a destination between a plurality of the reels and a destination adjacent to one of the reels.

36. The gaming device of claim 33, which includes an animation produced by the display device, the animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation of transformation into a different shape, an animation of transformation into a different size, an animation of separating into different parts, an animation of expanding, an animation of contracting, an animation of changing colors, an animation of changing shades, an animation of changing patterns and an animation including illumination.

37. The gaming device of claim 33, which includes a speaker in communication with the display device, the speaker and the display device producing an animation selected from the group consisting of an animation including sound and an audio-visual animation including any one of the symbols.

38. The gaming device of claim 33, which includes a graphical change displayed by the display device, the graphical change selected from the group consisting of a graphical change including a removal of any one of the symbols, a graphical change including a removal of a background image associated with any one of the symbols and a graphical change including a removal of at least one image between a plurality of the reels.

39. The gaming device of claim 33, wherein the display device has an electronic configuration adapted to receive input through a network selected from the group consisting of a playing station network, a local area network, a wide area network and an internet.

40. A gaming device comprising:

a primary game operable upon a wager by a player, the primary game including a plurality of reels;

a plurality of symbols on each of said reels, each of the symbols having a designated position on the reels, whereby when each of the reels move, said symbols on said reels move, the movement of the reels causing different combinations of the symbols to be displayed to the player during multiple plays of the primary game;

a plurality of values awardable to the player, each of said values associated with a different one of the combinations of symbols;

at least one bonus triggering event occurring when a designated one of the symbols or a designated one of the combinations of symbols is displayed in the primary game;

a bonus round initiated by the bonus triggering event;

at least one bonus value greater than zero awardable to the player, the bonus value associated with the bonus triggering event;

a graphical representation including a plurality of the symbols traveling toward each other;

a display device which displays the reels, the symbols and the graphical representation;

a processor in communication with the display device which causes the display device to display the graphical representation after the bonus triggering event occurs; and a payout available to the player, the payout based on: (a) any of the values awarded to the player in the primary game; and (b) the bonus value awarded to the player, if any.

41. The gaming device of claim 40, wherein the graphical representation includes: (a) the traveling symbols traveling along a line on the reels; and (b) removal of at least a portion of one of the symbols located on the line between the traveling symbols and the destination.

42. The gaming device of claim 40, wherein the graphical representation is selected from the group consisting of a graphical representation including at least one of the symbols traveling from one of the designated positions on one of the reels to a different position on any portion of said reel, a graphical representation including at least one of the symbols traveling from one of the designated positions on one of the reels to a portion of a different reel, a graphical representation including at least one of the symbols traveling from one of the designated positions on one of the reels to a position between a plurality of the reels and a graphical representation including at least one of the symbols traveling from one of the designated positions on one of the reels to a position adjacent to any one of the reels.

43. The gaming device of claim 40, which includes an animation produced by the display device, the animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation of transformation into a different shape, an animation of transformation into a different size, an animation of separating into different parts, an animation of expanding, an animation of contracting, an animation of changing colors, an animation of changing shades, an animation of changing patterns and an animation including illumination.

44. The gaming device of claim 40, which includes a speaker in communication with the display device, the speaker and the display device producing an animation selected from the group consisting of an animation including sound and an audio-visual animation including any one of the symbols.

45. The gaming device of claim 40, which includes a graphical change displayed by the display device, the graphical change selected from the group consisting of a graphical change including a removal of any one of the symbols, a graphical change including a removal of a background image associated with any one of the symbols and a graphical change including a removal of at least one image between a plurality of the reels.

46. The gaming device of claim 40, wherein the display device has an electronic configuration adapted to receive input through a network selected from the group consisting of a playing station network, a local area network, a wide area network and an internet.

47. A gaming device comprising:

a primary game operable upon a wager by a player, the primary game including a plurality of reels;

a plurality of symbols on each of said reels, each of the symbols having a designated position on the reels, whereby when each of the reels move, said symbols on said reels move, the movement of the reels causing different combinations of the symbols to be displayed to the player during multiple plays of the primary game;

a plurality of values awardable to the player, each of said values associated with a different one of the combinations of symbols;

a bonus triggering event occurring when a designated one of the symbols or a designated one of the combinations of symbols is displayed in the primary game;

a bonus round initiated by the bonus triggering event;

at least one bonus value greater than zero awardable to the player, the bonus value associated with the bonus triggering event;

a display device which displays the reels, the symbols and which, after the bonus triggering event occurs, displays a race involving at least one of the symbols racing against another one of the symbols on the reels; and a payout available to the player, the payout based on: (a) any of the values awarded to the player in the primary game; and (b) the bonus value awarded to the player, if any.

48. The gaming device of claim 47, which includes a graphical representation displayed by the display device, the graphical representation including: (a) at least one of the racing symbols traveling along a line on the reels; and (b) removal of at least a portion of one of the other symbols located on the line.

49. The gaming device of claim 47, which includes a destination for one of the racing symbols which is traveling toward another symbol, the destination selected from the group consisting of a destination on any portion of any one of the reels, a destination between a plurality of the reels and a destination adjacent to one of the reels.

50. The gaming device of claim 47, which includes an animation produced by the display device, the animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation of transformation into a different shape, an animation of transformation into a different size, an animation of separating into different parts, an animation of expanding, an animation of contracting, an animation of changing colors, an animation of changing shades, an animation of changing patterns and an animation including illumination.

51. The gaming device of claim 47, which includes a speaker in communication with the display device, the speaker and the display device producing an animation selected from the group consisting of an animation including sound and an audio-visual animation including any one of the symbols.

52. The gaming device of claim 47, which includes a graphical change displayed by the display device, the graphical change selected from the group consisting of a graphical change including a removal of any one of the symbols, a graphical change including a removal of a background image associated with any one of the symbols and a graphical change including a removal of at least one image between a plurality of the reels.

53. The gaming device of claim 47, wherein the display device has an electronic configuration adapted to receive input through a network selected from the group consisting of a playing station network, a local area network, a wide area network and an internet.

54. A gaming device comprising:

a primary game operable upon a wager by a player, the primary game including a plurality of reels;

a plurality of symbols on each of said reels, said symbols including a plurality of characters, each of the symbols having a designated position on the reels, whereby when each of the reels moves, said symbols move, the movement of the reels causing different combinations of the symbols to be displayed to the player during multiple plays of the primary game;

a plurality of values awardable to the player, each of said values associated with a different one of the combinations of symbols;

at least one bonus triggering event occurring when a designated one of the symbols or a designated one of the combinations of symbols is displayed in the primary game;

a bonus round initiated by the bonus triggering event;

at least one bonus value greater than zero awardable to the player in the bonus round, the bonus value associated with the bonus triggering event; a graphical representation including at least one of the characters traveling to and interacting with another one of the characters;

a display device which displays the reels, the symbols and the graphical representation;

a processor in communication with the display device which causes the display device to display the graphical representation after the bonus triggering event occurs; and a payout available to the player, the payout based on: (a) any of the values awarded to the player in the primary game; and (b) the bonus value awarded to the player, if any.

55. The gaming device of claim 54, wherein the graphical representation includes: (a) the traveling character traveling along a line on the reels; and (b) removal of at least a portion of one of the characters located on the line between the traveling character and the destination.

56. The gaming device of claim 54, wherein the graphical representation is selected from the group consisting of a graphical representation including at least one of the symbols traveling from one of the designated positions on one of the reels to a different position on any portion of said reel, a graphical representation including at least one of the characters traveling from one of the designated positions on one of the reels to a portion of a different reel, a graphical representation including at least one of the characters traveling from one of the designated positions on one of the reels to a position between a plurality of the reels and a graphical representation including at least one of the characters traveling from one of the designated positions on one of the reels to a position adjacent to any one of the reels.

57. The gaming device of claim 54, which includes an animation produced by the display device, the animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation of transformation into a different shape, an animation of transformation into a different size, an animation of separating into different parts, an animation of expanding, an animation of contracting, an animation of changing colors, an animation of changing shades, an animation of changing patterns and an animation including illumination.

58. The gaming device of claim 54, which includes a speaker in communication with the display device, the speaker and the display device producing an animation selected from the group consisting of an animation including sound and an audio-visual animation including any one of the symbols.

59. The gaming device of claim 54, which includes a graphical change displayed by the display device, the graphical change selected from the group consisting of a graphical change including a removal of any one of the symbols, a graphical change including a removal of a background image associated with any one of the symbols and a graphical change including a removal of at least one image between a plurality of the reels.

60. The gaming device of claim 54, wherein the display device has an electronic configuration adapted to receive input through a network selected from the group consisting of a playing station network, a local area network, a wide area network and an internet.

61. A gaming device comprising:

a primary game operable upon a wager by a player, the primary game including a plurality of reels;

a plurality of symbols on each of said reels, each of the symbols having a designated position on the reels, whereby when each of the reels moves, said symbols move, the movement of the reels causing different combinations of the symbols to be displayed to the player during multiple plays of the primary game;

a plurality of values awardable to the player, each of said values associated with a different one of the combinations of symbols;

at least one bonus triggering event occurring when a designated one of the symbols or a designated one of the combinations of symbols is displayed in the primary game;

a bonus round initiated by the bonus triggering event;

at least one bonus value greater than zero awardable to the player in the bonus round, the bonus value associated with the bonus triggering event;

a display device which displays the reels, the symbols and which, after the bonus triggering event occurs, displays a chase involving at least one of the symbols chasing another one of the symbols on the reels; and a payout available to the player, the payout based on: (a) any of the values awarded to the player in the primary game; and (b) the bonus value awarded to the player, if any.

62. The gaming device of claim 61, which includes a graphical representation displayed by the display device, the graphical representation including: (a) at least one of the chasing symbols traveling along a line on the reels; and (b) removal of at least a portion of one of the other symbols located on the line.

63. The gaming device of claim 61, wherein at least one of the symbols has a destination selected from the group consisting of a location on any portion of any one of the reels, a location between a plurality of the reels and a location adjacent to one of the reels.

64. The gaming device of claim 61, which includes an animation produced by the display device, the animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation of transformation into a different shape, an animation of transformation into a different size, an animation of separating into different parts, an animation of expanding, an animation of contracting, an animation of changing colors, an animation of changing shades, an animation of changing patterns and an animation including illumination.

65. The gaming device of claim 61, which includes a speaker in communication with the display device, the speaker and the display device producing an animation selected from the group consisting of an animation including sound and an audio-visual animation including any one of the symbols.

66. The gaming device of claim 61, which includes a graphical change displayed by the display device, the graphical change selected from the group consisting of a graphical change including a removal of any one of the symbols, a graphical change including a removal of a background image associated with any one of the symbols and a graphical change including a removal of at least one image between a plurality of the reels.

67. The gaming device of claim 61, wherein the display device has an electronic configuration adapted to receive input through a network selected from the group consisting of a playing station network, a local area network, a wide area network and an internet.

68. A method for operating a gaming device comprising:

(a) enabling a player to initiate multiple plays of a primary game operable upon a wager wherein the primary game includes a plurality of reels;

(b) displaying the reels;

(c) displaying a plurality of symbols on each of said reels, each of said symbols having a designated position on the reels;

(d) spinning the reels, thereby causing different combinations of the symbols to be displayed to the player during multiple plays of the primary game;

(e) enabling the player to receive an award of a plurality of values, each of said values associated with a different one of the combinations of symbols;

(f) causing at least one bonus triggering event to occur when a designated one of the symbols or a designated one of the combinations of symbols is displayed in the primary game;

(g) initiating a bonus round when the bonus triggering event occurs;

(h) enabling the player to receive an award of at least one bonus value greater than zero, the bonus value associated with the bonus triggering event;

(i) providing at least one destination on one of said reels;

(j) displaying at least one of the symbols traveling toward the destination; and (k) providing a payout to the player, the payout based on: (i) any of the values awarded to the player in the primary game; and (ii) the bonus value awarded to the player, if any.

69. The method of claim 68, which includes the steps of: (a) displaying the traveling symbol traveling along a line; and (b) removing at least a portion of one of the symbols located on the line between the traveling symbol and the destination.

70. The method of claim 68, wherein the step of providing at least one destination on one of said reels includes the step of providing a destination which includes one of the symbols, providing a destination which includes a portion of any one of the reels, providing a destination which includes a location between a plurality of the reels and providing a location adjacent to one of the reels.

71. The method of claim 68, which includes the step of displaying a plurality of the symbols racing against one another.

72. The method of claim 68, which includes the step of displaying at least one of the symbols chasing at least one other symbol.

73. The method of claim 68, which includes the step of displaying a plurality of the symbols interacting with each other.

74. The method of claim 68, which includes the step of graphically changing an image located between one of the traveling symbols and the destination.

75. The method of claim 68, which includes the step of providing a plurality of different destinations on at least one of the reels.

76. The method of claim 75, which includes the step of displaying a plurality of the traveling symbols moving toward the destinations.

77. The method of claim 68, which includes the step of producing an animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation including transformation into a different shape, an animation including transformation into a different size, an animation of separating into different parts, an animation of expanding, an animation of contracting, an animation of changing colors, an animation of changing shades, an animation of changing patterns, an animation including illumination, an animation including a sound and an audio-visual animation including any one of the symbols.

78. The method of claim 68, which includes the step of displaying a graphical change, the graphical change selected from the group consisting of removal of any one of the symbols, removal of a background image associated with any one of the symbols and removal of at least one image between a plurality of the reels.

79. The method of claim 68, which includes the step of receiving input through a network selected from the group consisting of a playing station network, a local area network, a wide area network and an internet.

80. A method for operating a gaming device comprising:

(a) enabling a player to initiate multiple plays of a primary game operable upon a wager wherein the primary game includes a plurality of reels; (b) displaying the reels;

(c) displaying a plurality of symbols on said reels, each of the symbols having a designated position on the reels;

(d) spinning the reels, thereby causing different combinations of the symbols to be displayed to the player during multiple plays of the primary game;

(e) enabling the player to receive an award of a plurality of values, each of said values associated with a different one of the combinations of symbols;

(f) causing at least one bonus triggering event to occur when a designated one of the symbols or a designated one of the combinations of symbols is displayed in the primary game;

(g) initiating a bonus round when the bonus triggering event occurs;

(h) enabling the player to receive an award of at least one bonus value, the bonus value associated with the bonus triggering event;

(i) providing at least one destination on one of said reels;

(j) enabling the player to activate at least one of the symbols by making an input;

(k) displaying at least one of the symbols traveling toward the destination; and (l) providing a payout to the player, the payout based on: (i) any of the values awarded to the player in the primary game; and (ii) the bonus value awarded to the player, if any.

81. The method of claim 80, which includes the steps of:

(a) displaying the traveling symbol traveling along a line; and (b) removing at least a portion of one of the symbols located on the line between the traveling symbol and the destination.

82. The method of claim 80, wherein the step of providing at least one destination on one of said reels includes the step of providing a destination which includes one of the symbols, providing a destination which includes a portion of any one of the reels, providing a destination which includes a location between a plurality of the reels and providing a location adjacent to one of the reels.

83. The method of claim 80, which includes the step of displaying a plurality of the symbols interacting with each other.

84. The method of claim 80, which includes the step of graphically changing an image located between one of the traveling symbols and the destination.

85. The method of claim 80, which includes the step of providing a plurality of different destinations on at least one of the reels.

86. The method of claim 85, which includes the step of displaying a plurality of the traveling symbols moving toward the destinations.

87. The method of claim 80, which includes the step of producing an animation selected from the group consisting of an animation of any one of the symbols, an animation of a plurality of the symbols, an animation including an interaction of a plurality of the symbols, an animation including a movement of any one of the symbols toward another one of the symbols, an animation including a movement of a plurality of the symbols toward one another, an animation of behavior, an animation of bending, an animation including transformation into a different shape, an animation including transformation into a different size, an animation of separating into different parts, an animation of expanding, an animation of contracting, an animation of changing colors, an animation of changing shades, an animation of changing patterns, an animation including illumination, an animation including a sound and an audio-visual animation including any one of the symbols.

88. The method of claim 80, which includes the step of displaying a graphical change, the graphical change selected from the group consisting of removal of any one of the symbols, removal of a background image associated with any one of the symbols and removal of at least one image between a plurality of the reels.

89. The method of claim 80, which includes the step of receiving input through a network selected from the group consisting of a playing station network, a local area network, a wide area network and an internet.

* * * * *

UNITED STATES PATENT AND TRADEMARK OFFICE

CERTIFICATE OF CORRECTION

PATENT NO. : 6,918,832 B2
DATED : July 19, 2005
INVENTOR(S) : Anthony J. Baerlocher et al.

It is certified that error appears in the above-identified patent and that said Letters Patent is hereby corrected as shown below:

<u>Column 13,</u>
Line 7, change “move” to -- move, --.

<u>Column 19,</u>
Line 38, change “characters” to -- symbols --.

<u>Column 21,</u>
Line 17, change “claim 61” to -- claim 84 --.

Signed and Sealed this

Twenty-fourth Day of January, 2006

JON W. DUDAS
*Director of the United States Patent and Trademark Office*